Figure 1:
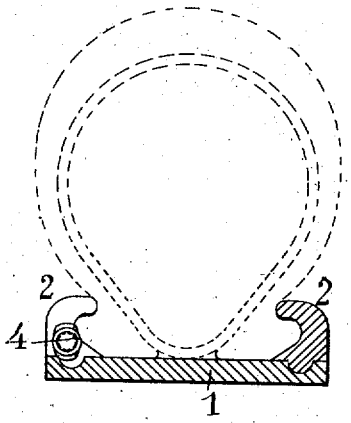

No. 12,777. REISSUED APR. 7, 1908.

F. A. SEIBERLING.

VEHICLE WHEEL RIM.

APPLICATION FILED MAR. 3, 1908.

Witnesses
Ivan Konigsberg
M. Tretzloff.

Inventor
Frank A. Seiberling
By his Attorneys
Lyons & Bissing

UNITED STATES PATENT OFFICE.

FRANK A. SEIBERLING, OF AKRON, OHIO.

VEHICLE-WHEEL RIM.

No. 12,777. Specification of Reissued Letters Patent. Reissued Apr. 7, 1908.

Original No. 766,044, dated July 12, 1904, Serial No. 192,947. Application for reissue filed March 3, 1908. Serial No. 419,056.

*To all whom it may concern:*

Be it known that I, FRANK A. SEIBERLING, a citizen of the United States, residing at Akron, in the county of Summit and State of Ohio, have invented a certain new and useful Improvement in Vehicle-Wheel Rims, of which the following is a complete specification.

My invention relates generally to vehicle-wheel rims, and has especial relation to those rims which are designed to form the support or base for double-tube pneumatic tires.

Heretofore it has been customary with manufacturers to construct the rims of vehicle-wheels of designs peculiarly and individually adapted to receive certain particular makes of tires, and these rims as a consequence are not arranged, suited or shaped to receive tires of any other make or description, and from this it follows as a natural sequence that the owner of a vehicle having the rims of its wheels constructed to retain one shape of tire is prevented from placing thereon another form of tire, no matter what may be the exigencies or need therefor.

With these facts in view, the objects of my invention are to manufacture a rim which, by a simple change in the arrangements of its parts, is capable of forming the base or support for a tire of wholly different construction than that which was originally mounted thereon, and, further, to enable this change to be made with comparatively simple tools and by a person of little or no mechanical ability. A sample of the need of this resource in the construction of rims would be where the operator of a vehicle equipped with a peculiar form of tire meets with an accident which absolutely ruins the outer tube of one or more of the tires of his vehicle at a location where others of a similar make are unobtainable, but other tubes of a wholly different construction are procurable, and a further object is to construct a rim, which is primarily adapted for retaining the outer cover of a double-tube tire wherein the fastening devices on the cover for retaining it in place consist of barb-shaped strips of beading along the edges of the longitudinal opening in the inner periphery of the cover and are arranged to be engaged by inturned clencher side flanges, that the stretching over one of the side flanges, ordinarily necessary in placing this kind of cover in place, is wholly eliminated and the cover is placed in position without any resulting longitudinal "slack," so that when inflated the barb-shaped beading engages the clencher-flanges more readily and firmly.

To the accomplishment of the aforesaid objects my invention consists in the peculiar and novel construction, arrangement, and combination of parts hereinafter described, reference being had to the accompanying drawings, forming a part hereof.

Figure 2:
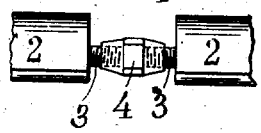
Figure 3:
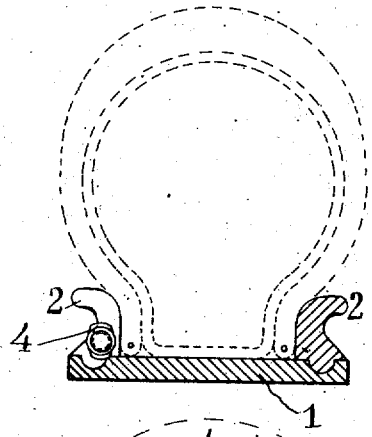
Figure 4:
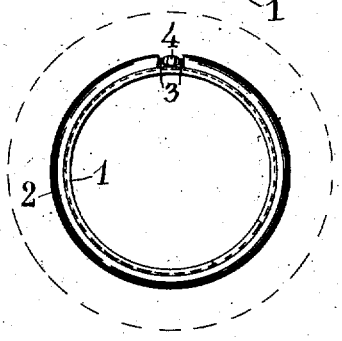

In the drawings,—Figure 1 represents a sectional view of a vehicle-wheel rim with retaining devices placed in position to receive one kind of tire. Fig. 2 represents the tightening mechanism for tightening the retaining devices in place; Fig. 3 is a sectional view of a vehicle-wheel rim with retaining devices in a position opposite to that shown in Fig. 1; and Fig. 4 shows a side elevation of a wheel rim with retaining devices and tightening means in the position shown in Fig. 1.

In the drawings, 1 represents an ordinary flat circumferential wheel-rim, which forms the bottom or base for receiving the retaining devices hereinafter described. This flat wheel-rim 1 may inclose a wooden felly or form itself the outside rim of the tire. Near each of the side edges of this wheel-rim 1, on the outer periphery thereof, are cut, shaped, or rolled longitudinal depressions having a preferred cross-sectional shape and which extend entirely around the rim 1. Arranged to enter these depressions are circumferential bands or fastening devices 2, having on their base portion projections equivalent and exactly corresponding to the depressions in the outer periphery of the rim 1. Above this base they are generally comparatively straight on one side, but have on the other side an in-cut portion which forms with the top of the bands a hooked opening in the side. These bands are arranged to pass substantially entirely around the rim; but their ends are slightly separated and have projecting therefrom threaded studs 3, the threads of the studs on each band being in opposite directions to permit a nut or turnbuckle 4 by its revolution on the threads on the studs to draw them together or permit their separation. This turnbuckle 4 may be of any construction and be capable of receiving different implements for its manipulation, and instead of a turnbuckle or nut a single stud or bolt provided at opposite ends with threads cut in different directions arranged to enter threaded openings in the ends of the bands 2 may be employed. This part of the invention, however, is unessential, as any suitable tightening device is entirely within the scope of this invention.

It is obvious that in placing a tire the outer cover of which has the commom clencher beadings along its edges in position on the tire, as shown in Fig. 1, one circumferential band being placed in position the tire is readily slipped over the rim 1 into position with its inner tube deflated, and by placing the other circumferential band in place the hooked portions of the bands 2 will engage the barbs readily and retain them in place. Of course after placing the cover in position the turnbuckle of each band is operated to a needed extent for tightening the bands. This avoids the necessity of stretching the outer cover, with its inclosed inner tube, over one of these side-flanges. The reverse of this operation is equally simple, as when it is desired to remove the cover for repairs or any other reason, and a description thereof seems superfluous.

If at any time it is desired to place on the wheel-rim the common inextensible-edge tire in which longitudinal wires are embedded along the edges of the opening in the cover, the two bands are removed and one is reversed and placed in position, as shown in Fig. 3, the tire deflated is slipped sidewise onto the rim 1, and the other band placed in position and drawn to the necessary degree of tightness. The tire is then inflated and the rounded corners of the bands 2, which are presented toward the tire, serve to form a smooth and proper support for the tire when in use.

By this construction it will be seen that by very simple means, the manipulation of which is at all times within the reach of a person of very ordinary mechanical ability and substantially without tools of any kind, the placing or removing of tires of either description upon this rim is easily attained both quickly and securely.

Instead of employing exactly the construction shown by the drawings it is obvious that it is entirely within the scope of my invention to change the cross-sectional shape of both the grooves in the base 1 and the ridges in the base of the bands 2, as well as to place the grooves or depressions in the bands themselves and locate corresponding ridges on the base or their equivalents.

What I claim is,—

1. A vehicle-wheel rim of the class described, consisting of a base-rim and a band capable of contraction on and a reversal of position around said rim, one of the sides of said band being formed into a hook-shape and the other with an approximately vertical side and fashioned to engage, in alternation, the clencher and inextensible-edge tires, substantially as and for the purpose described.

2. An improved rim for vehicle-wheels designed to receive an elastic tire thereon, consisting of a base-rim provided with parallel grooves in its periphery and two extensible rings capable of being contracted about said base-rim and seat in said grooves, having one of their sides made into a hook to engage one form of tire and with their other sides approximately vertical to form a holding means for a different shape tire when reversed in position on said base-rim.

3. A vehicle wheel rim of the class described, consisting of a base-rim and a band capable of contraction on and a reversal of position around said rim, one of the sides of said band being formed into a hook shape and the other with an approximately vertical side, in combination with a clencher tire shoe and an inextensible edge tire shoe respectively, substantially as and for the purpose described.

In testimony that I claim the above I hereunto set my hand in the presence of two subscribing witnesses.

FRANK A. SEIBERLING.

In presence of—
H. H. McCloskey,
W. E. Palmer.